United States Patent
Hayase et al.

[11] Patent Number: 5,808,546
[45] Date of Patent: Sep. 15, 1998

[54] CANCEL MECHANISM OF TURN INDICATOR

[75] Inventors: Fumitaka Hayase, Nagoya; Kazuya Shioda, Niwa, both of Japan

[73] Assignee: Kabushiki Kaisha Tokai Rika Denki Seisakusho, Japan

[21] Appl. No.: 829,830

[22] Filed: Mar. 25, 1997

[30] Foreign Application Priority Data

Mar. 28, 1996  [JP]  Japan ................................. 8-104316

[51] Int. Cl.$^6$ ...................................................... B60Q 1/40
[52] U.S. Cl. ...................... 340/476; 340/475; 200/61.27; 200/61.3; 200/61.34
[58] Field of Search ................................. 340/475, 476; 200/61.27, 61.3, 61.31, 61.32, 61.33, 61.34, 61.35, 61.36

[56] References Cited

U.S. PATENT DOCUMENTS

| | | | |
|---|---|---|---|
| 4,123,632 | 10/1978 | Muto | 200/61.27 |
| 4,335,284 | 6/1982 | Ochiai et al. | 200/61.27 |
| 4,351,991 | 9/1982 | Morita et al. | 200/61.27 |
| 4,859,816 | 8/1989 | Tanaka | 200/61.27 |
| 5,406,253 | 4/1995 | Doke et al. | 340/475 |

*Primary Examiner*—Jeffery A. Hofsass
*Assistant Examiner*—Ashok Mannava
*Attorney, Agent, or Firm*—Beyer & Weaver, LLP

[57] ABSTRACT

A cancel mechanism of a turn indicator includes a projection adapted to rotate along an outer circumference of a steering wheel shaft. A bracket is positioned around at least portions of the outer circumference of the shaft. The bracket is rotatable in a generally circumferential direction around the shaft between an inactive position and an active position. A ratchet, having a first and second end, is positioned with its first and second ends in slidable engagement with associated first and second ends of the bracket. The ratchet also includes a projection retaining portion for retaining the projection when the shaft is turned in a canceling direction thereby returning the bracket to the inactive position. A biasing mechanism biases the ratchet toward the bracket. When the bracket is positioned in the active position and the shaft is turned in a direction opposite to the canceling direction, the projection comes into contact with the ratchet (i) causing the first end of the ratchet to slide along the first end of the bracket in a generally radially outward direction relative to the shaft and (ii) causing the second end of the ratchet to slide along the second end of the bracket in a generally radially inward direction relative to the shaft, thereby allowing the projection to pass by the ratchet without substantially moving the bracket.

8 Claims, 6 Drawing Sheets

CANCEL MECHANISM OF TURN INDICATOR

BACKGROUND OF THE INVENTION

1. Field of the Invention

The present invention relates to a cancel mechanism of a turn indicator and, more particularly, to a cancel mechanism for reducing a sound (i.e., a forward canceling relief click) when a steering wheel is turned in a direction indicated by the turn indicator.

2. Description of the Related Art

In a cancel mechanism of a turn indicator of the prior art, as shown in FIGS. 6A and 6B, a rotary ring 22 having projections on its outer circumference is mounted on a steering shaft 20, and there is disposed around the outer circumference of the steering shaft 20 a bracket 26 which is moved by a turn indicator lever 24. The bracket 26 is bifurcated, and a ratchet 30 is attached to the leading ends of the legs of the bracket 26. On the outer side of the center of the ratchet 30, there is mounted a turn piece 35 which is urged onto a snug plateau 28 of the body by a compressed coil spring 32. The bracket 26 has its turning center at the side opposed to the lever 24. When the driver operates the lever 24 in the steering direction before the vehicle is steered, the lever 24 is moved from an inactive position, as shown in FIG. 6A, to an active position, as shown in FIG. 6B. At this time, the turn piece 35 rides over the snug plateau 28 so that the bracket 26 is held in the shown position.

The steering wheel is ordinarily steered according to the operation of the turn indicator so that rotary ring 22 is turned in the indicated direction of the turn indicator, i.e., in the steering direction. At this time, one of projections 36, as formed in a plurality (or two in this example) of portions on the outer circumference of the rotary ring 22, comes into abutment against the inner periphery of the ratchet 30 to raise the ratchet 30 radially outward. The projection 36 of the rotary ring 22 is brought from the outside close to one of two steps 38 and 39 which are formed to face each other in the inner periphery of the ratchet 30, so that the ratchet 30 is raised radially outward while receiving no substantial force on the turning axis. As a result, the projection 36 passes over the step 38 while raising the ratchet 30. Incidentally, the bracket 26 is moved by the operation of the lever so that the other projection 36 of the rotary ring 22 is turned without contacting with the other step 39.

When the steering wheel is returned after the vehicle makes a turn, the rotary ring 22 is turned backward according to the return of the steering wheel. As a result, the projection 36 comes into abutment against the step 38 of the ratchet 30 to push in the turning (circumferential) direction thereby to move the bracket 26 through the ratchet 30. Specifically, the turn piece 35 is moved to ride over the snug plateau 28 to the inactive position (as shown in FIG. 6A) in accordance with the operation of the steering wheel. By this operation, the indication of the turn indicator is canceled.

In the cancel mechanism of the turn indicator of the prior art, however, when the steering wheel is operated in the turning direction, there arises a problem that the sound is made each time the projection 36 raises the ratchet 30 radially outward to pass over the step 38 (or the step 39 when the steering wheel is turned backward). This sound is called the "forward canceling relief click." This forward canceling relief click is generated when the ratchet 30, as raised outward, is brought into collision against the ratchet receiving face of the bracket 26 while being vigorously returned, as passed over by the projection 36, to its original position. The ratchet 30 is urged by the turn piece 35 with built-in coil spring 32.

In the prior art, the shock is damped to reduce the forward canceling relief click by applying highly viscous grease to the ratchet receiving faces. After use of a long time, the grease may be gradually forced out of the ratchet receiving faces, or the grease may lose its viscosity and flow out in the hot circumstances. Thus, a permanent counter-measure has never been provided.

SUMMARY OF THE INVENTION

The present invention has been conceived to solve the above-specified problem and has an object to reduce the forward canceling relief click.

According to a first aspect of the present invention, there is provided a cancel mechanism of a turn indicator for returning a vehicular turn indicator lever, as operated in one direction and retained in an active position, to an inactive position by the returning operation of a steering wheel, comprising:

a rotary ring adapted to be turned together with the shaft of the steering wheel and having projections on its outer circumference;

a bracket positioned around the outer circumference of the rotary ring and moved to different turn indicating positions in the circumferential direction of the shaft as the lever is operated in one direction;

a ratchet so retained in two positions of the radial direction of the bracket as to rock with respect to the bracket and having such retaining portions in its inner periphery as can retain the projections of the rotary ring, when turned in one direction, only after the bracket has been moved to the turn indicating positions; and a snug imparting mechanism including a member disposed at an intermediate portion of the ratchet for pushing the ratchet toward the shaft, so that a motion which the member rides over a snug plateau as the lever is operate, gives a holding action for the ratchet, wherein when the rotary ring is turned in the indicating direction of the turn indicator so that the projections come into abutment against the inner periphery of the ratchet to move it radially outward, the other end of the ratchet, as retained by the bracket, is moved radially inward as one end of the ratchet, as retained by the bracket, is moved radially outward.

According to this cancel mechanism of the turn indicator, when the steering wheel is turned backward of the indicating direction of the turn indicator, the protrusion is retained by the retaining portion to turn the ratchet in one direction thereby to return the lever to the inactive position. When the projection raises the ratchet in accordance with the turn of the rotary ring while the steering wheel is being turned in the indicating direction of the turn indicator, one end of the ratchet is moved radially outward whereas the other end is moved radially inward. As a result, the movement of the ratchet in the radial direction of the turning axis, as pushed toward the turning axis by the member of the snug imparting mechanism, is reduced, and the pushing force by the snug imparting mechanism is not high so that the sound is reduced.

In the cancel mechanism of the turn indicator, on the other hand, the end portions, to be retained by the bracket, of the ratchet have step portions for receiving the end portions of the bracket, and the step portions may preferably be shaped to have an obtuse angle. Thanks to these shapes, the rocking motions of the ratchet can be easily realized.

At least one of the ratchet surface and the bracket surface at portions, where the ratchet and the bracket contact, may have a portion having a larger coefficient of friction than that intrinsic to the material of the ratchet or the bracket. According to this cancel mechanism of the turn indicator, the contacting faces of the bracket and the ratchet have a portion having a larger coefficient of friction than that intrinsic to the material of the ratchet or the bracket so that the frictional force on the contacting faces is higher than the construction having such portion. Since the bracket and the ratchet move relative to each other while contacting with each other at their end faces, while the steering wheel is being turned in the turning direction, the returning speed of the ratchet, i.e., the speed to collide against the ratchet receiving faces of the bracket at the time when the rotary ring to turn with the shaft of the steering wheel passes over the steps of the ratchet is suppressed by increasing the frictional force by the aforementioned treatment. As a result, it is possible to improve the effect of lowering the forward canceling relief click by the aforementioned rocking motion of the ratchet. In order to form the portion which has a higher coefficient of frictional than that intrinsic to the material, at least one of the ratchet and the bracket may be subjected to a surface roughening treatment. When the ratchet or the bracket is to be manufactured by a mold, the surface roughness can be easily increased by the so-called "craping treatment" to roughen or etch the surface of the mold.

According to a second aspect of the cancel mechanism of the turn indicator of the present invention, there is provided a cancel mechanism of a turn indicator for returning a vehicular turn indicator lever, as operated in one direction and retained in an active position, to an inactive position by the returning operation of a steering wheel, comprising:

a rotary ring adapted to be turned together with the shaft of the steering wheel and having projections on its outer circumference;

a bracket positioned around the outer circumference of the rotary ring and moved to different turn indicating positions in the circumferential direction of the shaft as the lever is operated in one direction;

a ratchet so retained in two positions of the radial direction of the bracket as to rock with respect to the bracket and having such retaining portions in its inner periphery as can retain the projections of the rotary ring, when turned in one direction, only after the bracket has been moved to the turn indicating positions; and a snug imparting mechanism including a member disposed at an intermediate portion of the ratchet for pushing the ratchet toward the shaft, so that a motion which the member rides over a snug plateau as the lever is operate, gives a holding action for the ratchet, wherein at least one of the ratchet surface and the bracket surface at portions, where the ratchet and the bracket contact, has a portion having a larger coefficient of friction than that intrinsic to the ratchet or the bracket material.

According to the second cancel mechanism of the turn indicator, the contacting faces of the ratchet and the bracket are given a portion having a higher coefficient of friction than that intrinsic to the material, so that the returning speed of the ratchet is suppressed to lower the forward canceling relief click.

As another mode of the invention, as provided with the mechanism for suppressing the returning speed of the ratchet, it is conceivable in addition to the aforementioned construction to apply highly viscous grease to the contacting points between the ratchet and the bracket or adopt a hydraulic cylinder. Another construction can be considered, in which the contacting pressure at the points between the ratchet and the bracket is boosted.

DESCRIPTION OF THE PREFERRED EMBODIMENTS

Figure 6A:
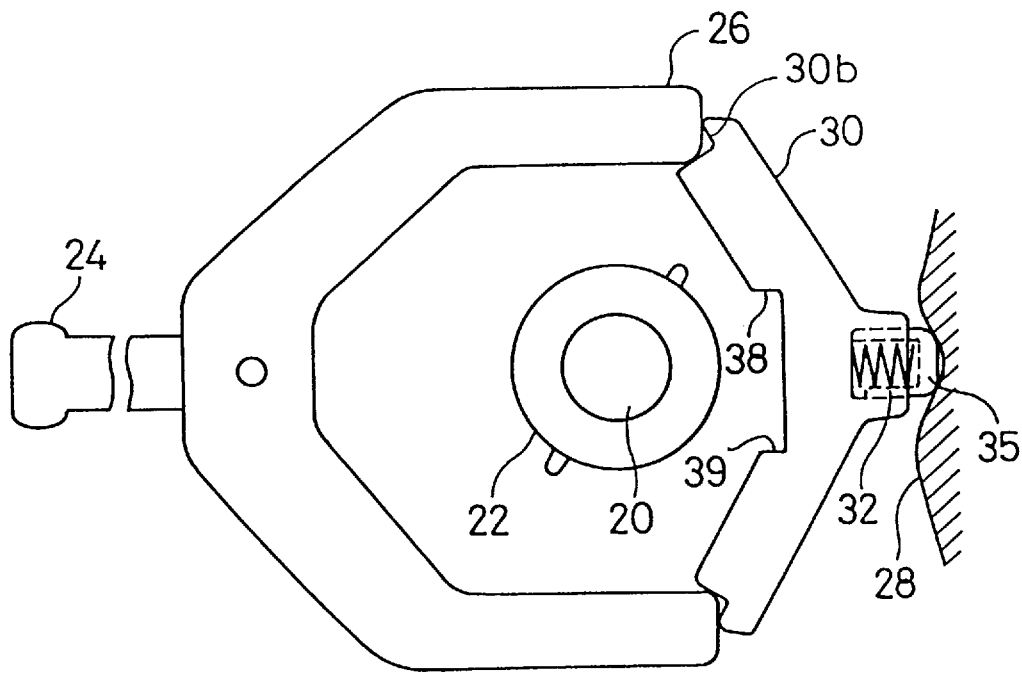
FIGS. 6A and 6B are explanatory diagrams for explaining the operations of the cancel mechanism of the prior art.
Figure 6B:
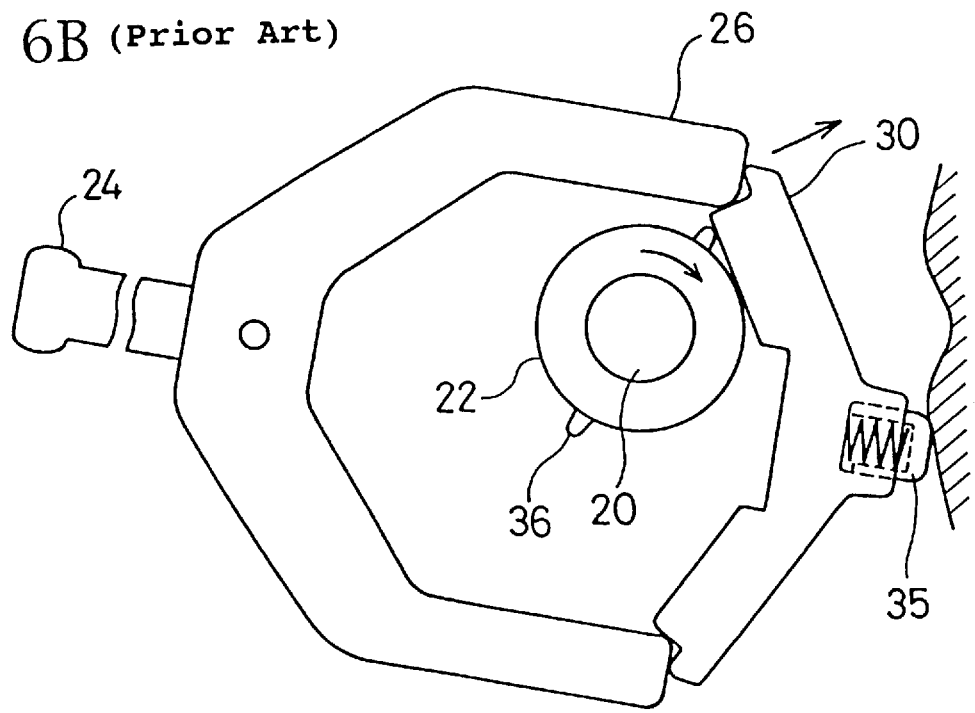

The present invention will be described in the following in connection with its embodiments. Of the components shown in FIG. 1, the same parts as those described as the prior art with reference to FIGS. 6A and 6B are designated by the common reference numerals excepting a ratchet 130. This ratchet 130 is made drastically different in its end portion contour from that of the prior art, as will be described in detail with reference to FIGS. 2A, 2B and 3. First of all, here will be described a schematic construction of the cancel mechanism of the turn indicator.

Figure 1:
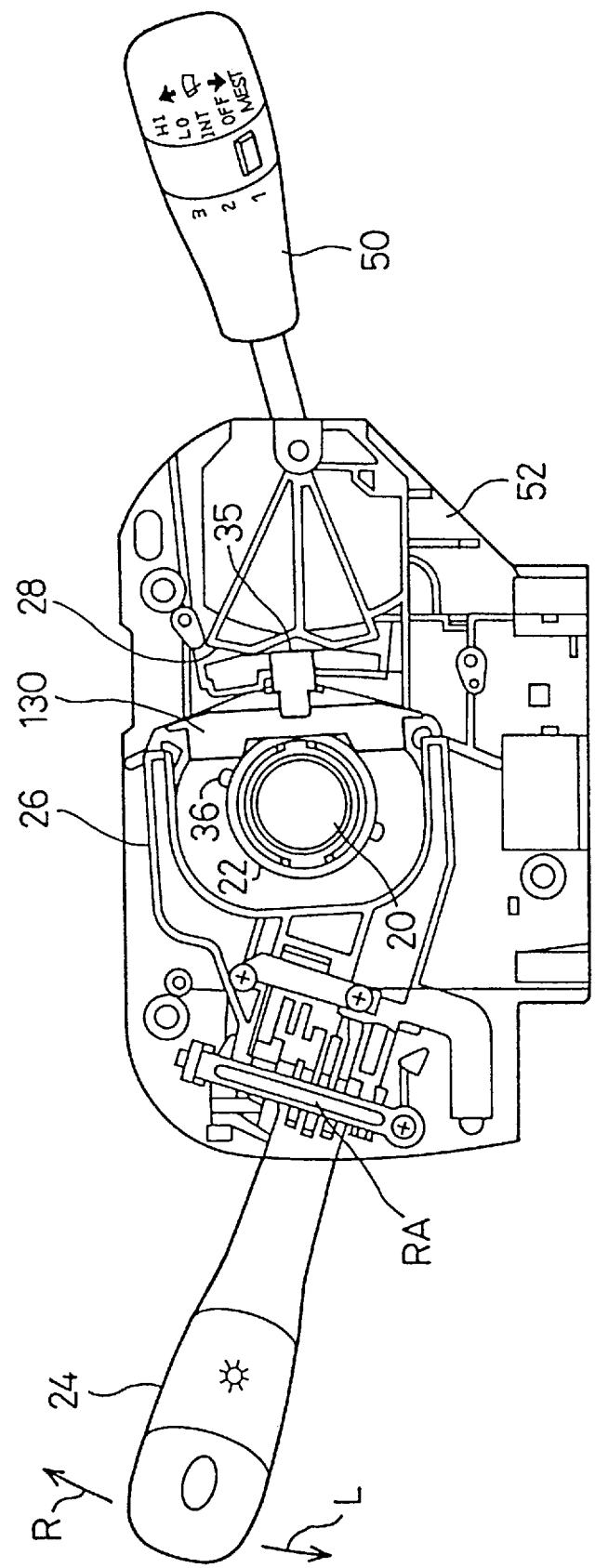
FIG. 1 is an assembly diagram showing the summary of a cancel mechanism of a turn indicator according to a first embodiment of the present invention.

The cancel mechanism of the turn indicator of the present embodiment has a schematic construction identical to that of the prior art, as has been described with reference to FIGS. 6A and 6B. As shown in FIG. 1, the cancel mechanism of the turn indicator of the present embodiment is mounted on a mounting body 52, through which a steering shaft 20 is extended at the center. The mounting body 52 is equipped on the steering shaft 20 with a turn indicator operating lever 24 at the left and a wiper operating wiper lever 50 at the right. The turn indicator lever 24 is so attached as to turn generally on a point RA. The lever 24 is bifurcated at its opposite side across the point RA to construct a bracket 26. This bifurcated bracket 26 is positioned to interpose the steering shaft 20.

To the two ends of the bifurcated bracket 26, there is attached the ratchet 130. Specifically, the ratchet 130 is attached merely by fitting its two end portions between the guides which are formed at the upper and lower leading ends of the bracket 26. The ratchet 130 is prevented from coming out of the bracket 26 by the contours of the two end portions of the ratchet 130 and by the fact that the ratchet 130 is pushed toward the bracket 26 by a turn piece 35 mounted at the central portion of the ratchet 130. The turn piece 35 is pushed with a predetermined urging force by a coil spring 32 (as shown in FIG. 6A), although not shown in FIG. 1, against a snug plateau 28 formed on the mounting body 52. This urging force of the turn piece 35 acts as a force to push the ratchet 130 at its two ends onto the bracket 26.

The side of the ratchet 130, as opposed to the turn piece 35, is close to a rotary ring 22 which is coaxially fitted on the steering shaft 20. This rotary ring 22 is equipped on its outer circumference with projections 36 which are located at two positions spaced by 180 degrees from each other. When the steering wheel is turned, the rotary ring 22 is turned to carry ratchet ections 36. The ratchet 130 is equipped with a mechanism for canceling the turn indicator lever 24, as set in an active position, according to the turning direction of the projections 36. Here will be described this cancel mechanism in the following.

Figure 2A:
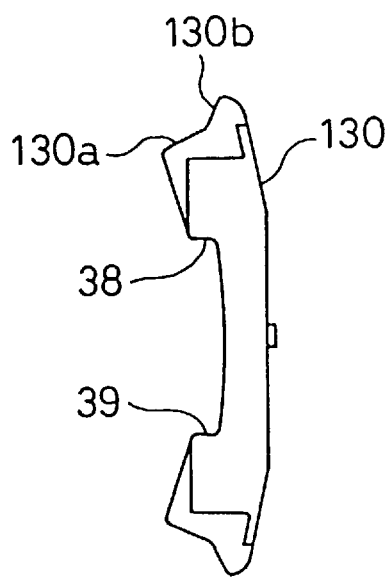
FIGS. 2A and 2B are top plan views for comparing the shapes of a ratchet 130 of the present embodiment and a ratchet 30 of an example of the prior art.
Figure 2B:
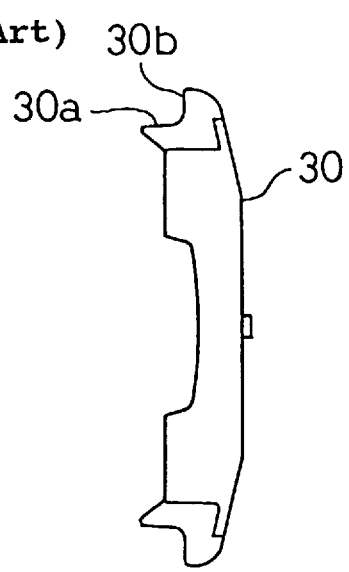
Figure 3:
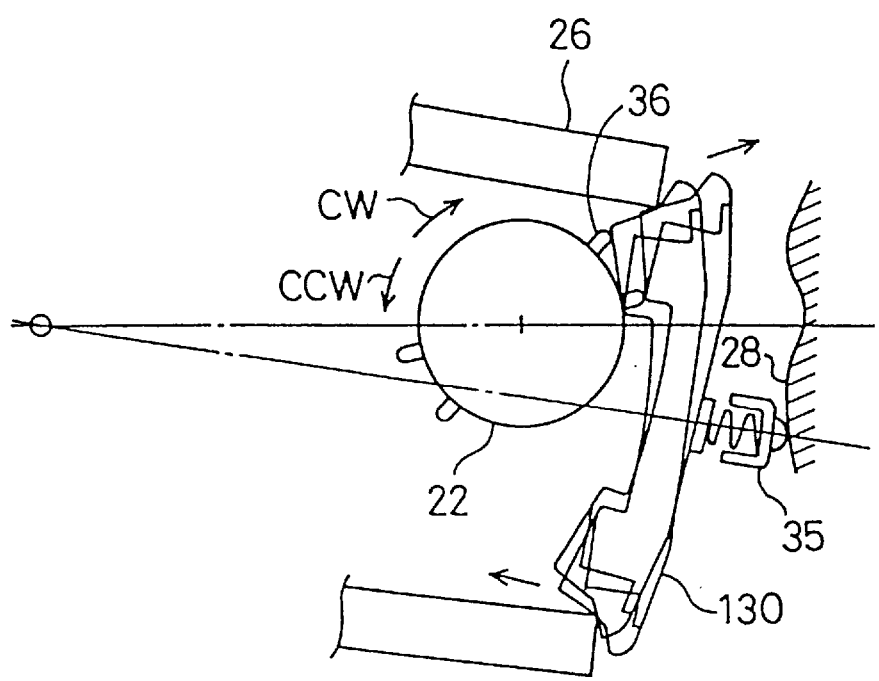
FIG. 3 is an explanatory diagram showing the motion of the ratchet 130 of the present embodiment.

The shape of the ratchet 130 in the embodiment is shown in FIG. 2A. Incidentally, the shape of the ratchet 30 of the prior art is shown in contrast in FIG. 2B. As shown, the ratchet 130 is equipped at the side of the rotary ring 22 with two steps 38 and 39. When the steering wheel is turned in the direction in a return direction backward of the direction which is indicated by the turn indicator, the projection 36 of the rotary ring 22 comes into engagement with one of the steps 38 and 39 so that they push the bracket 26 through the ratchet 130 to return the lever 24 to an inactive position. FIG. 3 shows the state (i.e., the position indicating the rightward turn), in which the lever 24 is set in the direction of arrow R, as shown in FIG. 1. If the steering wheel having finished the steering operation is turned counter-clockwise (as indicated by arrow CCW in FIG. 3) from this state, the projection 36 comes into engagement with the step 38 to move the ratchet 130 in the same direction as the rotary ring 22 turns. As a result, the turn piece 35 rides over the snug plateau 28 so that the ratchet 130, the bracket 26 and the lever 24 are returned to restore the inactive position of the turn indicator.

Here will be described the motion of the cancel mechanism when the steering wheel is turned in the direction in which the turn indicator lever 24 is set. While the handle is turned in the direction indicated by the turn indicator, the vehicle is turning so that the setting of the turn indicator should not be canceled by the turn of the rotary ring 22. The motions of the individual portions of this case will be described with reference to FIG. 3. In the state shown in FIG. 3, the bracket 26 and the ratchet 130 are not symmetrical with respect to the rotary ring 22 by the action of the lever 24. As a result, the projection 36 is kept out of engagement with the step 39 even if the steering wheel is turned clockwise CW. When the rotary ring 22 is turned clockwise CW, on the other hand, the projection 36 come closer to the ratchet 130 from one end side to turn the ratchet 130 while raising it radially outward. When the projection 36 passes the step 38 of the ratchet 130, the ratchet 130, as having been raised radially outward, is returned to the original position by the urging force of the turn piece 35. At this time, the ratchet 130 impinges upon the rotary ring 22 to make a sound called the "forward canceling relief click."

In the present embodiment, the two end contours of the ratchet 130 are different, as shown in FIG. 2A, from those of the ratchet 30 of the prior art. The two ends of the ratchet 30 of the prior art are formed of end walls 30a and 30b which are given a generally right angle in conformity with the contours of the end portions of the bracket 26, as shown in FIG. 2B. On the contrary, the end walls 130a and 130b of the two ends of the ratchet 130 of this embodiment are given an obtuse angle (e.g., about 115 degrees). As a result, it is not different in the least from the prior art that the ratchet 130 is raised when passed over by the projection 36. However, the motion of the ratchet 130 is not the rotary motion on the end portion at the side farther from the position of the projection 36 but the rocking motion in which the end portion farther from the projection 36 moves inward whereas the end portion close to the projection 36 moves outward.

Figure 4A:
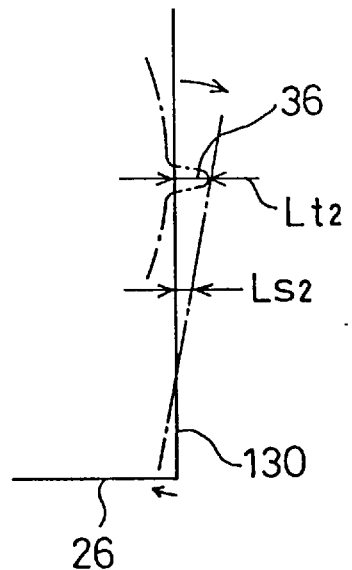
FIGS. 4A and 4B are explanatory diagrams showing the motion of the ratchet 130 in contrast to the motion of the ratchet 30 of the prior art.
Figure 4B:
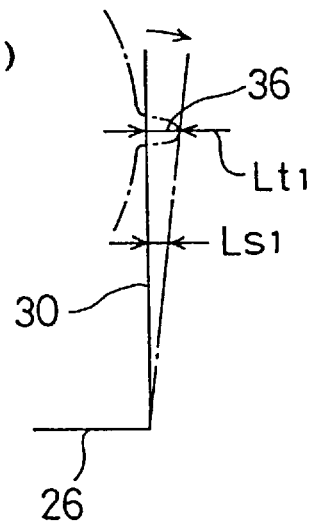

These motions are schematically illustrated in FIGS. 4A and 4B. Specifically, the ratchet 30 of the prior art rotates on the end portion of the bracket 26, as shown in FIG. 4B. As a result, when the ratchet 30 is moved by a distance Lt1 by the projection 36, the movement at the center of the ratchet 30, i.e., at the point, in which the turn piece 35 urges the ratchet 30 together with the snug plateau 28, is Ls1. The ratchet 30 is subjected to the compressive force of the coil spring 32, as corresponding to the movement Ls1. In the present embodiment, as shown in FIG. 4A, on the contrary, when the ratchet 130 is raised radially outward, not only the end portion closer to the projection 36 moves outward but also the end portion farther from the projection 36 moves inward by the relation at the center of the ratchet 130 between the urging force by the turn piece 35 and the point of application by the projection 36. As a result, the movement Ls2 at the center of the ratchet 130, i.e., at the point in which the turn piece 35 urges the ratchet 130 together with the snug plateau 28, is apparently smaller than the movement Ls1 of the prior art. Thus, the urging force for returning the ratchet 130, when passed over the projection 36, is reduced to lower the forward canceling relief click.

The forward canceling relief click is lowered by the aforementioned motion of the ratchet 130, especially by the reduction in the urging force of the coil spring 32 in the turn piece 35, and further as a result that the ratchet 130 moves without leaving the two ends of the bracket 26. In the example of the prior art, the ratchet 30 turns on its one end so that the one end 30b of the ratchet 30, as bent generally at a right angle and extended outward, contacts at first with the end portion of the bracket 26 but once leaves completely from the end portion of the bracket 26 as passed over by the projection 36. After this passage of the projection 36, the ratchet 30 restores its original position, and the one end portion 30b then impinges upon the end portion of the bracket 26 to make the sound. In the present embodiment, on the contrary, the end walls 130a and 130b of the end portions of the ratchet 130 make the obtuse angle so that neither of them leaves the end portions of the bracket 26 but they rock along the contours of the end portions of the bracket 26. As a result, when the ratchet 130 returns as passed over by the projection 36, the end portions of the ratchet 130 do not impinge upon the end portions of the bracket 26, but the moving speed of the ratchet 130 is suppressed to lower the forward canceling relief click by the frictional force which is established by the contact between the ratchet 130 and the bracket 26. Moreover, the grease, as applied, is not scattered by the movement of the ratchet 130 so that it can perform its role for a long time.

As described hereinbefore, the cancel mechanism of the turn indicator of the present embodiment is enabled by devising the shapes of the end portions of the ratchet 130 to reduce their movements, as caused by the passage of the projections 36, thereby to lower the forward canceling relief click.

Figure 5:
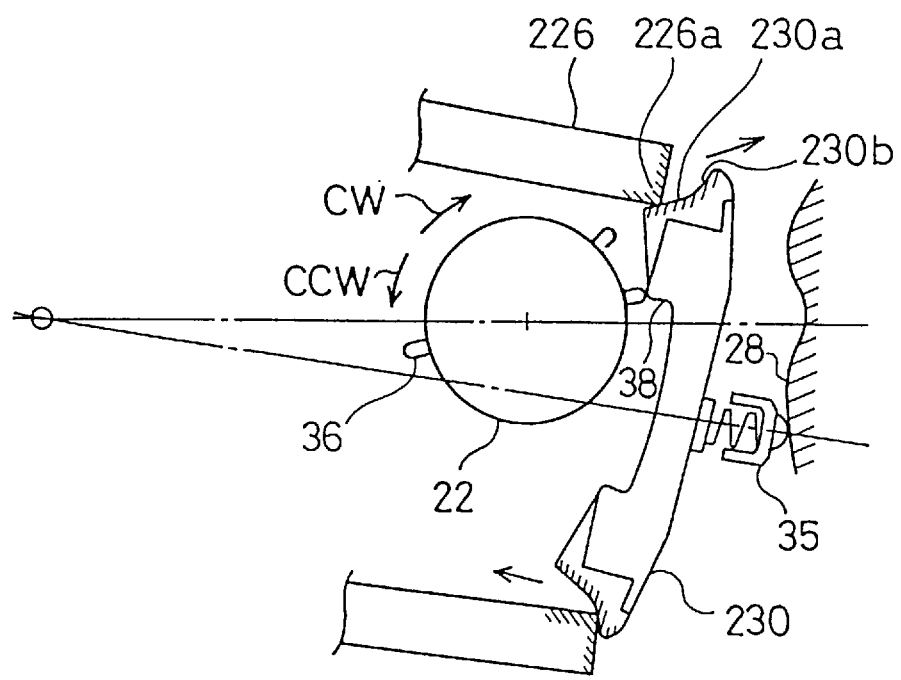
FIG. 5 is an explanatory diagram showing the summary of a cancel mechanism of a turn indicator according to a second embodiment of the present invention.

A second embodiment of the present invention will be described with reference to FIG. 5. Of the parts shown in FIG. 5, the same parts as those having been described as the prior art with reference to FIG. 6 are designated by the common reference numerals excepting a ratchet 230 and a bracket 226. These ratchet 230 and bracket 226 are craped to increase the coefficients of friction on their contacting faces, as will be described hereinafter.

In the operations of the second embodiment like those of the first embodiment, the end portions of the bracket 226 move while contacting with the end walls 230a and 230b of the ratchet 230. This ratchet 230 is craped all over the faces of its end walls 230a and 203b, and the bracket 226 is craped at the periphery of its contact end portion 226a to contact with the ratchet 230. Here, the craping treatment is meant to form a number of fine corrugations in the surfaces of the ratchet 230 and the bracket 226 by using the dies which are etched to cover the surfaces to be craped. The ratchet 230 and the bracket 226 are made of polyacetal and have a coefficient of friction of about 0.3 to 0.4 intrinsic to the material, unless craped. Thanks to the craping treatment, however, the surface roughness of the ratchet 230 and the bracket 226 can be raised to highly increase the coefficient of friction on their contact faces. As a result, when the steering wheel is turned forward, the ratchet returning speed at the instant when the ratchet 230 returns by the passage of the step 38 by the projection 36 can be suppressed to lower the forward canceling relief click.

As the means for increasing the coefficients of friction of the contact faces of the ratchet 230 and the bracket 226, it is conceivable to apply the highly viscous grease to the contact faces of the two. For this means, this step of applying the grease is required in addition to the ordinary steps of preparing the ratchet 230 and so on. For the craping treatment, on the other hand, the ratchet 230 and so on can be prepared as at the ordinary preparing steps merely by engraving or etching the mold, so that the desired effect can be achieved without raising the manufacture cost.

Incidentally, the frictional force of the ratchet 230 and the bracket 226 is changed not only by the number and level of the craped corrugations but also by the shape of the contact end portion 226a of the bracket 226 and by the pushing force of the coil spring for pushing the ratchet 230. As a result, the scale of the craped corrugations may be properly selected by considering those items synthetically. Moreover, it is not essentially necessary to crape both the faces of the ratchet 230 and the bracket 226 but arbitrary to crape only either of the two.

Although the present invention has been described in connection with its embodiments, it should not be limited thereto in the least but can naturally be embodied in various modes without departing from the aspect thereof.

What is claimed is:

1. A cancel mechanism of a turn indicator for returning a vehicular turn indicator lever, as operated in one direction and retained in an active position, to an inactive position by a returning operation of a steering wheel, comprising:

a rotary ring adapted to be turned together with a shaft of said steering wheel and having projections on its outer circumference;

a bracket positioned around said outer circumference of said rotary ring and moved to different turn indicating positions in a circumferential direction of said shaft as said lever is operated in one direction;

a ratchet having a first and a second end so retained in two positions of a radial direction of said bracket as to rock with respect to said bracket and said ratchet having such retaining portions in its inner periphery as can retain said projections of said rotary ring, when turned in one direction, after said bracket has been moved to said turn indicating positions; and a snug imparting mechanism including a member disposed at an intermediate portion of said ratchet for pushing said ratchet toward said bracket and said shaft, so that a motion caused when said member rides over a snug plateau as said lever is operated, gives a holding action for holding said ratchet against said bracket, wherein when said rotary ring is turned in the indicating direction of said turn indicator so that said projections come into abutment against the inner periphery of said ratchet to move it radially outward, said first end of said ratchet, as retained by said bracket, is moved radially inward as said second end of said ratchet, as retained by said bracket, is moved radially outward.

2. A cancel mechanism of a turn indicator according to claim 1, wherein said ratchet has end portions at both its first and second ends, said end portions, to be retained by said bracket, have step portions for receiving associated end portions of said bracket, and said step portions are shaped to have an obtuse angle relative to a symmetry axis of said bracket.

3. A cancel mechanism of a turn indicator according to claim 1, wherein at least one of said ratchet surface and said bracket surface, at said end portions where said ratchet and said bracket contact, has a portion having a larger coefficient of friction than that intrinsic to said ratchet or said bracket material.

4. A cancel mechanism of a turn indicator according to claim 2, wherein at least one of said ratchet surface and said bracket surface, at portions where said ratchet and said bracket contact, has a portion having a larger coefficient of friction than that intrinsic to said ratchet or said bracket material.

5. A cancel mechanism of a turn indicator for returning a vehicular turn indicator lever, as operated in one direction and retained in an active position, to an inactive position by a returning operation of a steering wheel, comprising:

a rotary ring adapted to be turned together with a shaft of said steering wheel and having projections on its outer circumference;

a bracket positioned around the outer circumference of said rotary ring and moved to different turn indicating positions in a circumferential direction of said shaft as said lever is operated in one direction;

a ratchet so retained in two positions of a radial direction of said bracket as to rock with respect to said bracket and having such retaining portions in its inner periphery as can retain said projections of said rotary ring, when turned in one direction, after said bracket has been moved to said turn indicating positions; and a snug imparting mechanism including a member disposed at an intermediate portion of said ratchet for pushing said ratchet toward said shaft, so that a motion caused when said member rides over a snug plateau as said lever is operated, gives a holding action for said ratchet, wherein at least one of said ratchet surface and said bracket surface, at portions where said ratchet and said bracket contact, has a portion having a larger coefficient of friction than that intrinsic to said ratchet or said bracket material.

6. A cancel mechanism of a turn indicator comprising:

a projection adapted to be rotated along an outer circumference of a steering wheel shaft;

a bracket positioned around at least portions of said outer circumference of said shaft, said bracket being rotatable in a generally circumferential direction around said shaft between an inactive position and an active position;

a ratchet having a projection retaining portion and a first and second end, said first and second ends of said ratchet being positioned in slidable engagement with an associated one of a first and second end of said bracket, said projection retaining portion facing said outer circumference of said shaft such that, when said bracket has been moved to said active position, said projection retaining portion retains said projection when said shaft is turned in a canceling direction thereby causing the rotation of said shaft in said canceling direction to return said bracket to said inactive position; and a biasing mechanism for holding said first and second ends of said ratchet in substantially continuous slidable engagement with said associated first and second ends of said bracket such that when said bracket is positioned in said active position and said shaft is turned in a direction opposite to said canceling direction, said projection comes into contact with said ratchet (i) causing said first end of said ratchet to slide along said first end of said bracket in a generally radially outward direction relative to said shaft and (ii) causing said second end of said ratchet to slide along said second end of said bracket in a generally radially inward direction relative to said shaft thereby allowing said projection to pass by said ratchet without substantially moving said bracket.

7. A cancel mechanism according to claim 6 wherein a surface of at least one of said ratchet and said bracket at said ends where said ratchet and said bracket are in contact with one another has a high friction portion having a larger coefficient of friction than that intrinsic to the material making up said ratchet or said bracket.

8. A cancel mechanism according to claim 7 wherein said high friction portion is formed by craping said high friction portion thereby increasing the roughness of said high friction portion to be larger compared to any non-craped portions.

* * * * *